Dec. 5, 1950  L. M. CAMPANI  2,533,091
PLURAL SCALE TELEMETERING INDICATING SYSTEM
Filed Feb. 14, 1947  2 Sheets-Sheet 1

INVENTOR.
LOUIS M. CAMPANI
BY
Robert S. Dunham
ATTORNEY

Dec. 5, 1950 L. M. CAMPANI 2,533,091
PLURAL SCALE TELEMETERING INDICATING SYSTEM
Filed Feb. 14, 1947 2 Sheets-Sheet 2
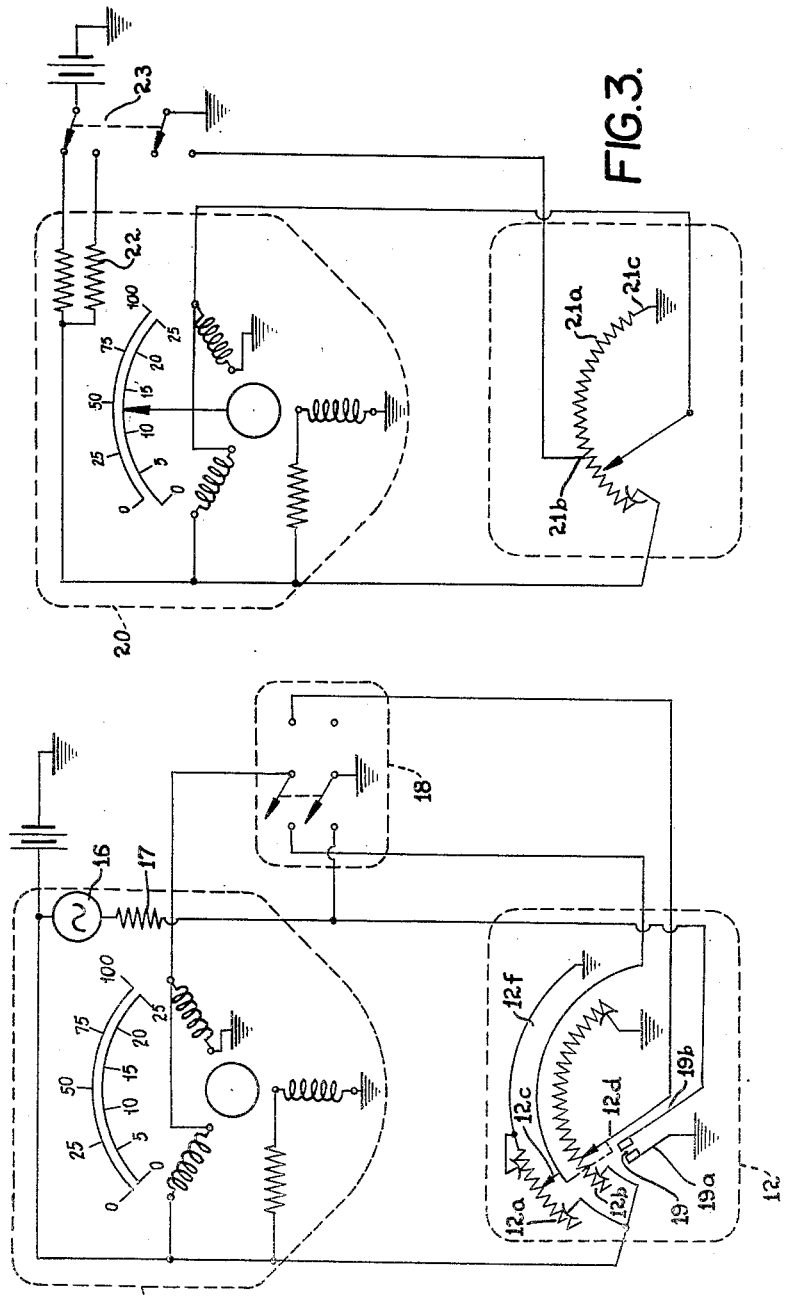
INVENTOR.
LOUIS M. CAMPANI
BY
Robert S. Dunham
ATTORNEY Patented Dec. 5, 1950

2,533,091

UNITED STATES PATENT OFFICE 2,533,091

PLURAL SCALE TELEMETERING INDICATING SYSTEM

Louis M. Campani, Freeport, N. Y., assignor to The Liquidometer Corporation, Long Island City, N. Y., a corporation of Delaware Application February 14, 1947, Serial No. 728,415

8 Claims. (Cl. 177—351)

This invention pertains to telemetric instruments and apparatus for indicating the magnitude of a condition, for example, the quantity of liquid in a tank.

In the measurement of fuel in aircraft, a reading of the indicator as the tank approaches empty becomes of increasing importance. From it a pilot must determine his remaining flying time and judge when he must come in for a landing. For such service the lower part of the scale becomes quite critical and it is advantageous to have that portion of the scale as long as possible in order to increase both the accuracy and the readability of the system.

Methods have been used in the past to increase the length of the lower portion of the scale. For example, it is possible to design a transmitter which has higher resistance density at the low end of the element, and a low resistance density at the high end of the element. In such cases it has been possible to register the first quarter of the contents of the tank on the first half of the chart, leaving the other three quarters for the second half of the chart. It is also possible to increase the spacing of the readings at the lower end of the chart mechanically by a suitable arrangement of the linkage system. Such methods, however, have the disadvantage that they improve one part of the scale at the expense of the other.

In the present invention the benefit of a longer scale, or chart, for the lower part of the tank is obtained without sacrificing any other part of the scale. This is obtained by providing two scales of equal length, one to operate over the total capacity of the tank, the other over any desired subdivision of the tank. In this manner a much longer effective scale is obtained than could be attained by the above mentioned methods since a comparatively small section of the scale may be amplified over the full range of the indicator. This may be achieved either manually or automatically as will appear. As illustrated and described, only two scales are provided, but more than two may be used if desired.

Further and other objects and advantages will be apparent from the specification and claims, and from the accompanying drawings which illustrate what is now considered the preferred embodiment of the invention.

In the drawings:

Fig. 2 is a modification of Fig. 1, for manual operation, and

Fig. 3 is an alternative method for manual operation.

Figure 1:
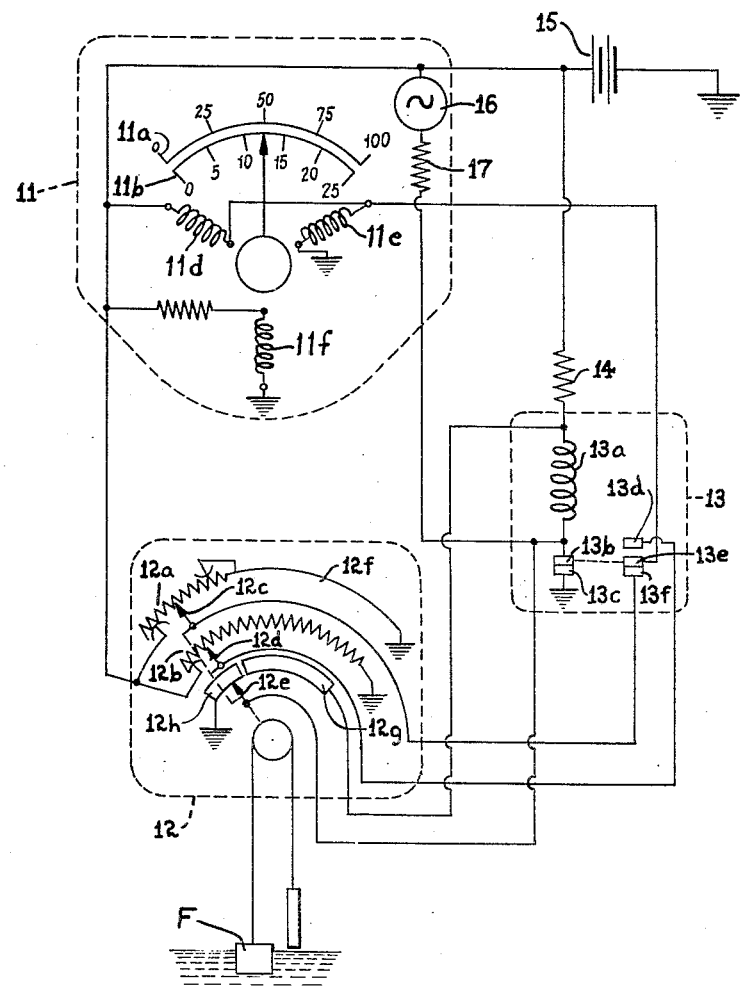
Fig. 1 shows a system for automatic operation.

In Fig. 1 the indicator $11$ is of conventional design except that the dial is provided with two scales $11a$ and $11b$. The lower scale $11b$ is arranged so that it is a fraction of the main scale $11a$. For example, if main scale $11a$ is 100 gallons, the auxiliary scale $11b$ may be 25 gallons or any other desired subdivision of 100. The instrument $11$ shown in the drawings is of the ratiometer type and has a single indicator pointer $11c$ cooperating with both scales $11a$ and $11b$. The position of the pointer is controlled by the resultant of the flux developed by two deflecting coils $11d$ and $11e$ in a conventional manner. The amplitude of the pointer movement may be controlled by a third coil $11f$, current flow through which is constant.

The tank unit, or transmitter, $12$ is composed of two resistance elements $12a$ and $12b$. Wipers $12c$, $12d$ and $12e$ are mechanically rigidly connected together, but are electrically separate. Resistance element $12a$ may have the same resistance as element $12b$, for example 200 ohms. However, resistance element $12b$ extends throughout the complete range of the travel of its wiper $12d$, while in element $12a$ the same resistance is concentrated over the portion of the travel of wiper $12c$ which it is desired to spread over the full movement of the indicator. Over the remainder of its displacement the wiper $12c$ may be made to travel on a track $12f$ of preferably conductive low resistance material. Each resistance element $12a$ and $12b$ and their respectively associated wipers $12c$ and $12d$ may be considered a voltage dividing means.

Also cooperating with the resistance elements $12a$ and $12b$ is a control switch of standard design composed of two strips of conducting material $12g$ and $12h$. A wiper $12e$ is arranged to make contact on either segment depending upon the position of the variable quantity. The position of the three wipers may, in a typical illustration, be controlled by the position of a float F in a tank.

A relay or solenoid $13$ is used to obtain automatic action. This relay is composed of a coil $13a$, one set of single-pole-single throw contacts $13b$ and $13c$, and one set of single-pole-double throw contacts $13d$, $13e$ and $13f$, the contacts $13c$, $13d$ and $13f$ being stationary and contacts $13b$ and $13e$ being movably carried by the relay armature. When coil $13a$ is de-energized contacts $13b$ and $13c$ are open, and contacts $13d$ and $13e$ are closed while $13e$ and $13f$ are open. Dropping resistor $14$ is used to prevent a short of the power supply $15$ as will later be described.

In operation, when the tank is full, all the wipers will be at the right hand side of the transmitter. Coil $13a$ of relay $13$ will be de-energized since it is shorted by a wiper $12e$ being in contact with switch segment $12g$. Contacts $13b$ and $13c$ will be open, hence no current will flow through resistor $14$. Contacts $13e$ and $13d$ will be closed, so that indicator $11$ will at this time be controlled by wiper $12d$ operating on resistance element $12b$. The indicator will continue to be controlled from wiper $12d$, and read on the upper scale $11a$ until the level drops to such a low point that wiper $12e$ contacts segment 12h. When this occurs, the lower terminal as shown of relay coil 13a is grounded through segment 12h and is energized. When coil 13a is energized, contacts 13b and 13c are closed as shown in Fig. 1, thus providing a ground connection which is independent of the ground connection in the tank unit through wiper 12e. Simultaneously, contact 13e is opened from 13d and closes with 13f. At this time control of the indicator 11 is transferred to wiper 12c, which is operating on resistance element 12a. It will be apparent that viewed from the indicator, when wiper 12c is at the right-most position on its resistance element, and is connected to the indicator, it is electrically at the same position as when wiper 12d is at its right-most position on its resistance element, and in turn connected to the indicator. Hence when the wiper 12c is connected in circuit, it will cause the indicator to show full scale again on the lower scale 11b and continue down to zero in the normal manner. To eliminate any confusion as to which scale is to be read, a light 16 is provided (with dropping resistor 17 if required) to go on when the transfer occurs indicating that the lower scale should be read.

The system will also operate in reverse. In filling, the indicator will operate initially on the lower scale. When the high point of the low scale is reached, say 25 gallons, wiper 12e will contact segment 12g, shorting out the coil 13a and deenergizing the relay. At this time dropping resistor 14 prevents the power supply 15 from being shorted. Full current will flow through resistor 14 only during the short interval it takes to open contacts 13b and 13c.

The automatic action described in Fig. 1 may be made manual by providing a switch 18 as shown in Fig. 2. The transmitter 12 is essentially the same as that of Fig. 1 except that the automatic transfer switch 13 is eliminated. Wipers 12c and 12d are connected to opposite poles of a switch so that they can be selected at will for controlling the indicator. A light 16 and dropping resistor 17 are used as in Fig. 1 to indicate which scale is to be used. In a preferred embodiment of the invention, an auxiliary switch 19 is used having contacts 19a grounded and contact 19b connected directly to the warning light. Upon approaching empty with the switch in the right hand position and the resistance element 12b and wiper 12d controlling the indicator the light will go on, indicating that the operator may switch to the lower scale. As shown, this light 16, Fig. 2, will be operated by the switch 19 as a sort of low limit indicator so that the light will indicate not only that the switch 18 may be shifted to use the lower scale corresponding to that numbered 11b in Fig. 1, but also to indicate to the pilot that he is dangerously near the end of his fuel supply. Once the switch 18 has been shifted to its left hand terminal position, Fig. 2, the indicator 11 when read in conjunction with the lower scale will indicate exactly the amount of fuel remaining.

While the invention has been described in connection with a relay for automatic operation and a toggle switch for manual operation, it is entirely within the scope of this invention, in cases where sufficient power is available to provide a control switch operated by the wiper arm or other movable element to produce the same results. By this method automaticity is achieved without use of a relay. For this function, switches of the snap type are preferable.

Fig. 3 shows a variation of the invention where-in only one resistance strip is used. The system is shown for manual operation. Indicator 20 is similar to 11 of the previous illustrations with the exception that two dropping resistors are used selected by means of a manual switch. The purpose of two resistors are described below.

The transmitter of Fig. 3 is now composed of a single strip 21a with a tap at 21b depending on the desired range of the lower scale. One end of the strip is grounded such as at 21c. Tap 21b is brought out to a switch 23 and may be grounded by that switch when desired.

In operation the system will perform in the now familiar manner with the control switch in the position shown in Fig. 3. When a lower level such as 25 gallons is used, the operator will throw switch 23 which shorts out the portion of the transmitter between 21b and 21c. This returns the wiper to near ground potential which causes the pointer to return to full scale. It will be realized that since a portion of the resistance element is shorted the voltage across the indicator will change. This may not be detrimental in all cases, however, if it is desired to maintain the indicator voltage (or the voltage across the tank unit) constant, the control switch may be made to cut in another resistor 22 which will maintain a balanced condition. It will be realized that instead of having completely separate resistors, portions of one may be cut in or out as is well known in the art. It will further be realized that in cases when the power supply voltage is low enough, no dropping resistors will be required.

The invention has been described for use with direct current. If alternating current be used, the elements would be inductances or capacitances.

It is to be understood that the invention is not limited to the specific embodiment herein illustrated and described but may be used in other ways without departure from its spirit as defined by the following claims.

What is claimed is:

1. Telemetric apparatus for indicating the magnitude of a condition, comprising a single mechanical means movable in a predetermined path in accordance with and positioned as a function of the magnitude of the condition to be indicated, wiper means moved by said mechanical means, resistor means including resistor portions extending respectively along different ranges in the movement of said wiper means, said wiper means electrically contacting said resistor portions, an electrical indicating instrument having a single movable indicating element and a plurality of relatively stationary graduated scales cooperating therewith and graduated to correspond respectively with said ranges of said resistor portions, a source of E. M. F.; and an electric circuit including said resistor means, said indicating instrument, said source of E. M. F., a permanent connection from said indicating instrument to one end of said resistor means, said wiper means cooperating with said resistor portions as voltage dividers to control the position of said indicating element, and switching means interconnecting between said resistor portions and said indicating instrument for selectively connecting an electrically predetermined point in said circuit to said resistor portions, so as selectively to predetermine the resistor portion which shall control the position of said indicating element, so that a predetermined range of movement of said indicating element will selectively represent different predetermined ranges of the movement of said mechanical means and hence of the magnitude of the condition to be indicated.

2. Telemetric apparatus in accordance with claim 1, wherein said electrical indicating instrument has two deflecting coils for controlling the position of said movable indicating element, and wherein said source of E. M. F. has one terminal connected to one end of one of said coils and also to one end of said resistor means by said permanent connection, the other end of the first-named coil being connected to one end of the other of said coils and the remaining end of said other coil and the other terminal of said source of E. M. F. being grounded, wherein said wiper means includes a plurality of wipers, a conductor connecting each said wiper to said switching means, and a conductor connecting the interconnection between said two coils to said switching means and selectively connected thereby to one of said wipers.

3. Telemetric apparatus in accordance with claim 1, wherein said resistor means consists of a single electrical resistor having a single wiper in variable engagement therewith and which is carried by said movable mechanical means, and wherein said circuit includes switching means for selectively connecting different points along said resistor to a single electrically predetermined point in said circuit, said resistor portions extending from one end of said single resistor to said different points respectively.

4. Telemetric apparatus for indicating the magnitude of a condition, including an electrical indicating instrument having a plurality of relatively stationary scales representative of different ranges respectively of the magnitude of the condition to be indicated, and a single movable indicator pointer cooperating with all said scales; a transmitter for controlling the operation of said indicating instrument and having voltage dividing means including respectively cooperating movable wipers, said voltage dividing means being disposed and arranged to correspond respectively to the ranges of said plurality of scales; electrical connections from said indicating instrument to said transmitter, and means responsive to the magnitude of the condition to be indicated for automatically switching said connections from said indicating instrument selectively to each of said voltage dividing means in a predetermined range respectively of the magnitude of said condition.

5. Telemetric apparatus according to claim 4, wherein said electrical indicating instrument includes a supplemental indicator, and comprises in addition, switching means actuated by said condition responsive means for actuating said supplemental indicator to designate which of said charts is to be read.

6. Telemetric apparatus for indicating the magnitude of a condition, comprising a single mechanical means movable in a predetermined path in accordance with and positioned as a function of the magnitude of the condition to be indicated, resistor means including at least two electrical resistors having the same electric resistance but disposed and arranged to extend respectively different distances along the path of movement of said mechanical means, a wiper moved by said mechanical means cooperating respectively with and electrically contacting each of said resistors, an electrical indicating instrument having a single movable indicating element and a plurality of graduated scales cooperating therewith, a source of E. M. F., and an electric circuit including said resistors, said indicating instrument, said source of E. M. F., a permanent connection from said indicating instrument to one end of each of said resistors, and switching means effective to connect said wipers selectively with said indicating instrument, the other ends of said resistors being connected to an electrically predetermined point in said circuit, said circuit and said switching means being constructed and arranged to cause a predetermined range of movement of said movable indicating element selectively to represent different predetermined ranges of the movement of said mechanical means and hence of the magnitude of the condition to be indicated.

7. Telemetric apparatus in accordance with claim 6, wherein said electrical indicating instrument is a ratiometer type instrument having two deflecting coils, a conductor connecting one end of the first of said coils with one end of the second of said coils and also connecting these ends through said switching means selectively to said wipers, a conductor connecting one end of said source of E. M. F. with the first of said coils and with one end of each of said resistors, and ground connections from the other end of each of said resistors, the other terminal of said source of E. M. F. and the remaining terminal of the second of said coils of said electrical indicating instrument.

8. Telemetric apparatus in accordance with claim 6, wherein said electrical indicating instrument comprises a ratiometer type instrument having two deflecting coils, one end of one of which coils is connected to one end of the other thereof by an interconnecting conductor, and single-pole double-throw switch means for connecting this interconecting conductor selectively to each of two wipers cooperating with said resistors respectively, and comprising in addition, solenoid operated switch means for mechanically actuating said single-pole double-throw switch, a circuit arranged to be closed during the time said mechanical means is in a predetermined range of its path of movement for energizing the solenoid to operate said switch means to cause said indicating instrument to cooperate with a predetermined one of said resistors and its respectively associated slider, and a holding circuit for holding said solenoid operated switch means in one of its positions initiated by movement of said mechanical means into any part of said predetermined range, and circuit means associated with said holding circuit and including said solenoid for de-energizing said solenoid notwithstanding said holding circuit upon movement of said mechanical means to a part of its range of movement outside said predetermined range.

LOUIS M. CAMPANI.

REFERENCES CITED

The following references are of record in the file of this patent:

UNITED STATES PATENTS

| Number | Name | Date |
| --- | --- | --- |
| 1,263,308 | Bristol | Apr. 16, 1918 |
| 1,850,640 | Sperry | Mar. 22, 1932 |
| 2,154,066 | De Giers | Apr. 11, 1939 |
| 2,280,775 | Mirk | Apr. 28, 1942 |
| 2,400,190 | Clark | May 14, 1946 |
| 2,405,689 | De Giers | Aug. 13, 1946 |
| 2,448,461 | Postal | Aug. 31, 1948 |